United States Patent [19]

Iwahashi et al.

[11] Patent Number: 5,170,962
[45] Date of Patent: Dec. 15, 1992

[54] TAPE CASSETTE WITH LID ASSEMBLY WHICH, IN A CLOSED POSITION, PROTECTS FRONT AND REAR SURFACES OF A TAPE RUN EXTENDING ACROSS A RECESS AT THE FRONT OF THE CASSETTE

[75] Inventors: Yuji Iwahashi; Masanori Abe, both of Miyagi, Japan

[73] Assignee: Sony Corporation, Tokyo, Japan

[21] Appl. No.: 682,268

[22] Filed: Apr. 8, 1991

[30] Foreign Application Priority Data

Apr. 13, 1990 [JP] Japan .................. 2-39877[U]

[51] Int. Cl.⁵ .................. G11B 33/00; G11B 23/04
[52] U.S. Cl. .................. 242/199; 242/198; 360/132
[58] Field of Search .................. 242/199, 198; 360/132

[56] References Cited

U.S. PATENT DOCUMENTS

| 4,449,677 | 5/1984 | Ohta et al. | 360/132 |
| 4,669,021 | 5/1989 | Wakai et al. | 360/132 |
| 4,844,377 | 7/1989 | Shiomi et al. | 242/198 |
| 4,898,338 | 2/1990 | Oishi | 242/198 |

FOREIGN PATENT DOCUMENTS

| 3344474 | 6/1984 | Fed. Rep. of Germany . | |
| 58-128070 | 7/1983 | Japan | 360/132 |
| 60-113380 | 6/1985 | Japan | 360/132 |
| 61-32284 | 2/1986 | Japan | 360/132 |
| 2134076 | 8/1984 | United Kingdom . | |

*Primary Examiner*—Daniel P. Stodola
*Assistant Examiner*—John Q. Nguyen
*Attorney, Agent, or Firm*—Alvin Sinderbrand; William S. Frommer

[57] ABSTRACT

A tape cassette having an opening at the front of the cassette housing across which a run of the tape is guided is provided with a lid assembly which includes a front closure having a relatively deep outer portion joined at the top to a relatively shallow inner portion which embrace the tape run in a closed position of the lid assembly, a rear closure pivoted to the inner portion of the front closure for completing the enclosure of the tape run when embraced by the front closure, and a forwardly directed flange at the top of the cassette housing extending to the front closure in the closed position of the latter for closing the top of the front opening of the cassette housing without obstructing the mouse area thereof.

3 Claims, 4 Drawing Sheets

TAPE CASSETTE WITH LID ASSEMBLY WHICH, IN A CLOSED POSITION, PROTECTS FRONT AND REAR SURFACES OF A TAPE RUN EXTENDING ACROSS A RECESS AT THE FRONT OF THE CASSETTE

BACKGROUND OF THE INVENTION

1. Field of the Invention

This invention relates to a tape cassette for use with a video tape recorder or the like.

2. Description of the Prior Art

Heretofore, tape cassettes have been provided with closable lids for protecting magnetic tapes from dust or like material.

In a known tape cassette 1 as shown in FIGS. 1 and 2, a rectangular upper half 2 and lower half 3 constitute a cassette housing accommodating tape reels around which a magnetic tape (hereinafter referred to as a tape) is wound.

The upper half 2 and lower half 3 of the cassette housing have recessed front walls 5 and 6 formed to define a front recess or opening 8 at the front of the cassette 1 substantially over the entire width of the cassette.

A pair of tape guides 10 and 11 project forwardly at respective end portions of the recessed walls 5 and 6 and define respective end surfaces 8A and 8B of the recess or opening 8. A tape which is drawn out from the tape reels is guided by the tape guides 10 and 11 in a run 13 which extends across the front opening or recess 8.

A front closure 14 is vertically pivotable about pivots formed at opposite sides of the cassette housing adjacent the front of the latter. With this structure, the tape run 13 is exposed when the front closure 14 turned upwardly (FIG. 2) in the course of loading the cassette 1 in a video tape recorder, and on the other hand the tape 13 is covered at the front thereof when the front closure 14 is maintained in a closed or downwardly turned state (FIG. 1) after the tape cassette is ejected from the video tape recorder.

As shown in FIG. 3, the front closure 14 is generally formed to have an asymmetrical inverted U-shaped cross-section for integrally forming a relatively deep outer portion 15 joined at the top, as at 16, to a relatively shallow depending inner portion 17. A rear closure 18 is pivotally supported by pins formed at opposite ends of the lower end of the inner portion 17 of the front closure 14.

The rear closure 18 is integrally formed with an upper closure 20 and extends downwardly and forwardly therefrom so that, in the closed positions of the closures 14, 18 and 20 (FIG. 3), the rear closure 18 surrounds the tape run 13 in cooperation with the front closure 14.

Thus, the rear closure 18 and the front closure 14 define a tape chamber 22, in which the tape run 13 which extends along the front opening 8 is protected from dust or the like when the tape cassette 1 is stored or not in use.

On the other hand, the upper closure 20 is formed so that, in the closed positions of the closures, a flange 20a at the top of upper closure 20 is flush with the upper surface of the tape cassette 1 to cover a gap formed between the upper half 2 and the front closure 14.

Furthermore, the rear closure 18 is pivotable under the guidance of guide grooves (not shown) formed in the end surfaces 8A and 8B of the front opening 8 so that, when the front closure 14 is pivoted upwardly in response to loading of the tape cassette 1 in a video tape recorder, the tape run 13 which extends through the front opening 8 is exposed for loading about a head drum (not shown).

Thus, the tape run 13 is exposed for loading or is protected from dust or the like simply by turning the front closure 14 according to the need.

To load the tape about a head drum with this kind of the tape cassette 1, it is necessary to insert loading guides (not shown) from below into an area 24 (FIGS. 3 and 4, hereinafter referred to as a mouse area) defined by the rear closure 18, recessed front walls 5 and 6, and upper closure 20 while the front closure 14 is turned upwardly to its open position.

The conventional tape cassette 1 however has a drawback in that the mouse area 24 is narrow due to the diagonal extension of the rear closure 18.

This raises a problem in that, if the tape cassette slightly shifts when inserting the loading guides, there is the danger that the loading guides may be brought into contact with the rear closure 18.

OBJECTS AND SUMMARY OF THE INVENTION

In view of the foregoing, an object of this invention is to provide a tape cassette which is capable of making the so-called mouse area large as compared to the prior art.

The foregoing and other objects and advantages of the invention have been achieved by the provision of a tape cassette comprising a cassette housing accommodating tape reels and including upper and lower halves; a tape wound around the tape reels and guided therebetween in a run extending across an opening at the front of the cassette housing; and a lid assembly for such front opening characterized by:

a front closure pivoted on the housing for movement between open and closed positions and having an asymmetrical inverted U-shaped cross-section to provide a relatively deep outer portion, a relatively shallow inner portion, and a top portion therebetween for respectively covering a front surface of the tape run extended across the front opening, an upper part of a rear surface of the tape run, and an upper edge of the tape run when the front closure is in its closed position; and a rear closure mounted for pivotal movement relative to the shallow inner portion, and adapted to cover the remainder of the rear surface of the tape run extending across the front opening when the front closure is in its closed position;

the upper half of the cassette housing having a forwardly directed upper flange extended to the front closure in the closed position of the latter; and the cassette housing having wall surfaces located at the sides and back of the front opening and which, with the shallow inner portion of the front closure and the rear closure, define an enlarged mouse area.

The above and other objects, features and advantages of the invention will become more apparent from the following detailed description when read in conjunction with the accompanying drawings in which like parts are designated by like reference numerals or characters.

DETAILED DESCRIPTION OF PREFERRED EMBODIMENT OF THE INVENTION

Figure 1:
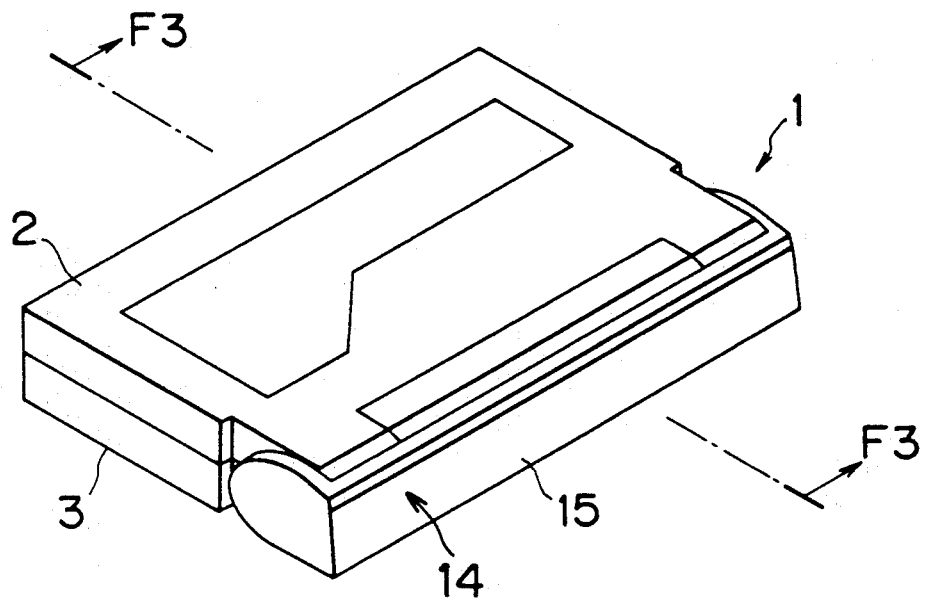
FIGS. 1 and 2 are perspective views illustrating a conventional tape cassette with its lid assembly in closed and opened positions, respectively.
Figure 2:
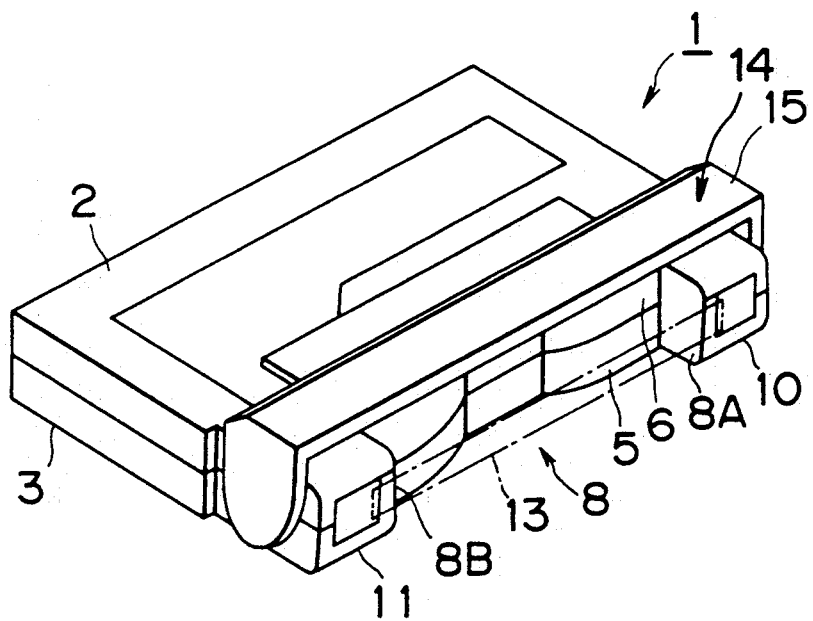
Figure 5:
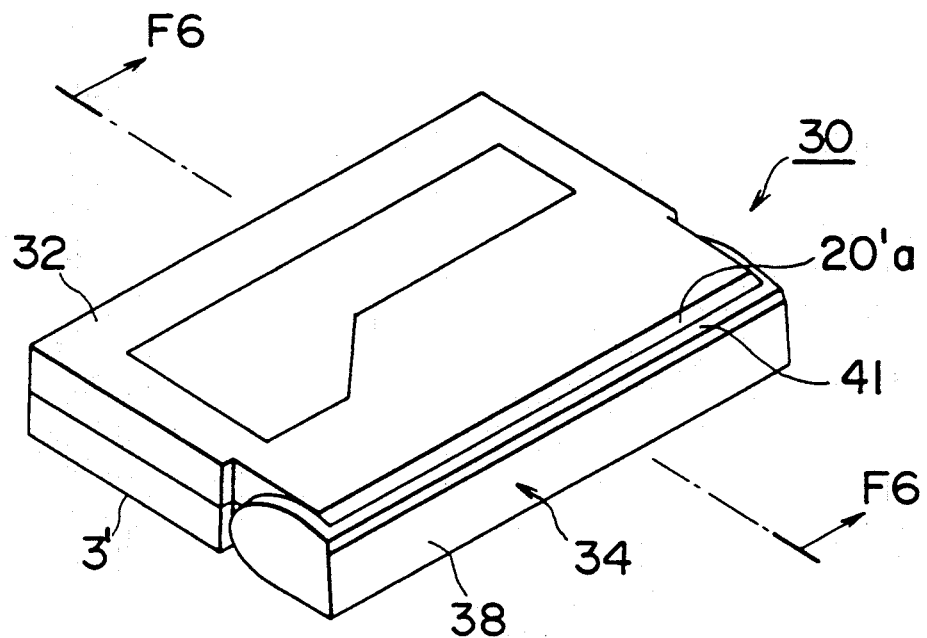
FIG. 5 is a perspective view illustrating a tape cassette according to one embodiment of this invention.

Referring initially to FIG. 5, in which parts corresponding to those described with reference to FIG. 1 are indicated by the same reference numerals, but with each such reference numeral having a prime appended thereto, it will be seen that a tape cassette 30 according to an embodiment of the invention has its housing formed so that the conventional upper half 2 and the upper closure flange 20'a (FIG. 3) are integrally formed into an upper half 32 of the housing.

Figure 6:
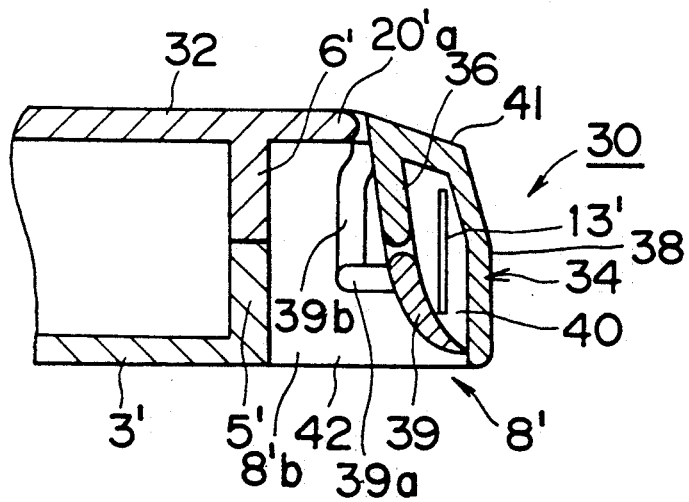
FIG. 6 is a sectional view taken the line F6—F6 in FIG. 5.

More specifically, as shown in FIG. 6, the upper surface of the upper half 32 has a forwardly directed upper flange 20'a which extends to the front closure 34 in the closed position of the latter so as to cover the upper portion of the front opening or recess 8'. Thus, the upper closure constituted by the flange 20'a is formed separately from a rear closure 39.

Figure 7:
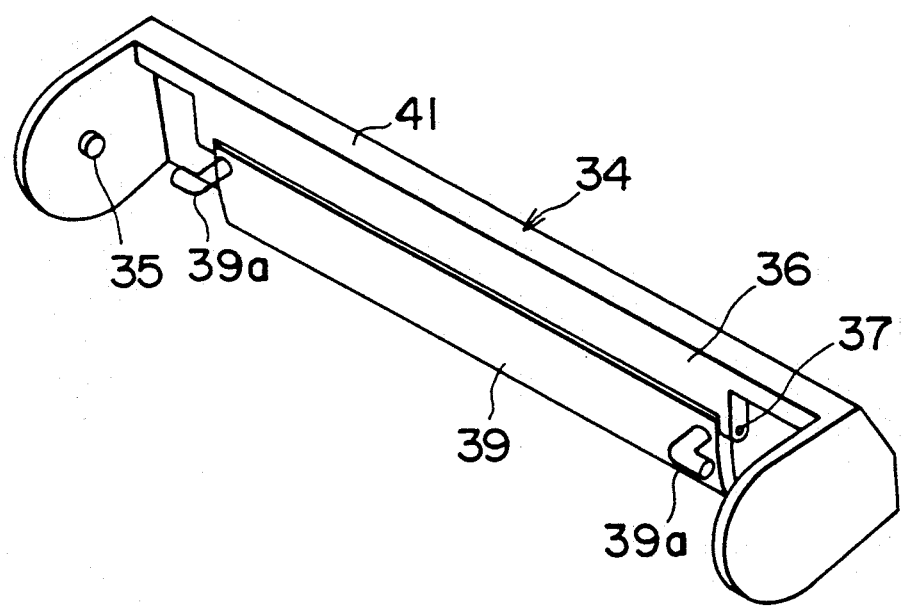
FIG. 7 is a perspective view illustrating a front closure and rear closure of a lid assembly included in the tape cassette of FIGS. 5 and 6.

As shown in FIG. 6, the front closure 34 is substantially of asymmetrical, inverted U-shaped cross-section similarly to the conventional front closure 14, and is pivotally supported at the front of the cassette housing by pins 35 (FIG. 7) formed at inner sides of opposite ends thereof.

The front closure 34 is substantially comprised of a relating shallow inner portion 36, and a relating deep outer portion 38 integrally joined at the top, as by an upper portion 41, with the inner portion 36. The rear closure 39 is pivotally supported on pins engaged in pin holes 37 formed through ears at opposite ends of the inner portion 36, and thereby the rear closure 39 is mounted to be rotatable about the axis of the pin holes 37 relative to the front closure 34.

The rear closure 39 is formed to extend to the lower edge surface of the outer portion 38 of front closure 34 from the inner portion 36, and the front closure 34 and the rear closure 39 thereby define a tape chamber 40 of substantially the same shape as the conventional one for protection of the tape run 13'.

Moreover, the rear closure 39 is guided, for example, by guide pins 39a conventionally engaging in grooves 39b (FIG. 6) shown formed in the end surface 8'B and similarly formed in the opposite end surface (not shown) of the front opening or recess 8' for pivotal movement relative to the front closure 34 when the latter is upwardly turned. The tape run 13' is thus exposed by turning the front closure 34 upwardly.

Figure 3:
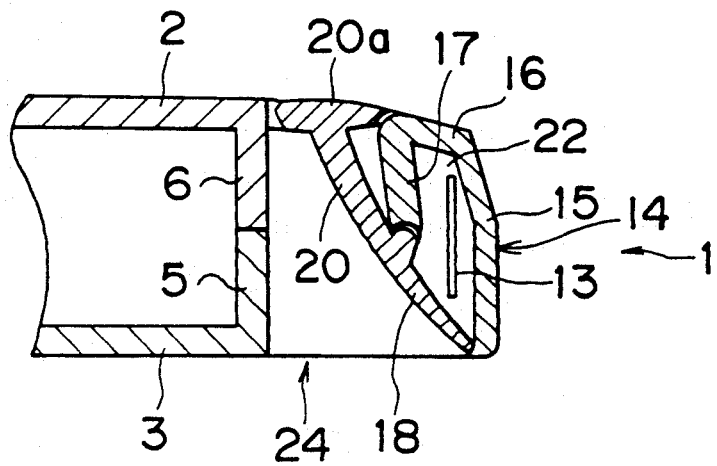
FIG. 3 is an enlarged sectional view taken along the line F3—F3 of FIG. 1.
Figure 4:
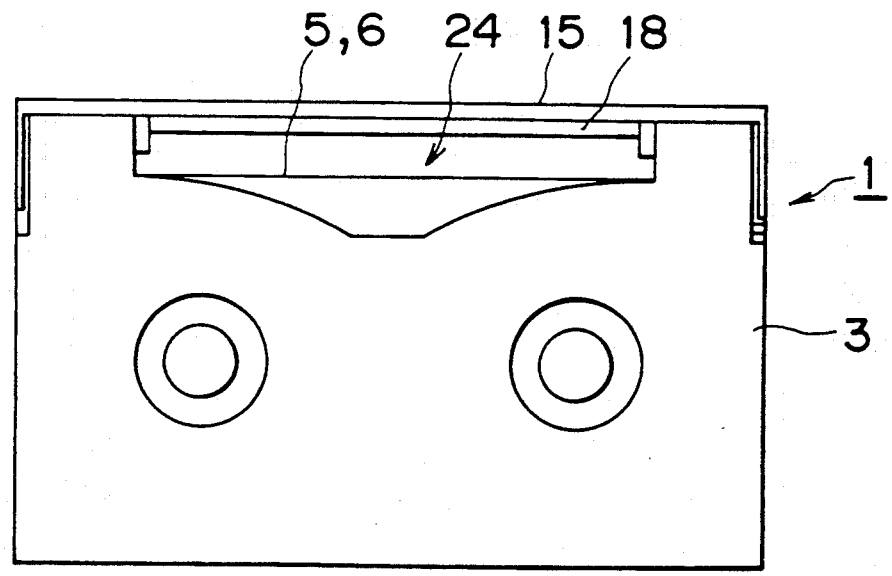
FIG. 4 is a bottom view of the tape cassette shown in FIG. 1.

By separately forming the rear closure 39 and the flange 20'a constituting the upper closure, the rear closure 39 may be thus formed to extend from the inner portion 36 of the front closure 34, and accordingly the mouse area 42 occupies a large space as compared to the conventional one shown in FIG. 3 and in which the supporting portion of the upper closure 20 extending to the flange 20a partly obstructs such space.

Thus, with the tape cassette 30, it is possible to positively load the tape while effectively avoiding any accidental contact with the loading guides.

Furthermore, the loading mechanism of the video tape recorder may be simplified to some extent by reason of the enlargement of the mouse area 42.

Moreover, it is possible to optimize the operating conditions for the loading mechanism and the tape running system.

In the foregoing construction embodying this invention, the upper closure constituted by the flange 20'a is integrally formed with the upper half 32 of the cassette housing, and the rear closure 39 and the upper closure are separately formed.

In the preceding description of the prior art, it is stated that loading is carried out by drawing out the magnetic tape from the cassette housing. However, the present invention is not limited to tape cassettes of that type but may be applied to various types of tape cassettes, such as, those in which the head drum enters the cassette housing for engaging the tape therein.

Furthermore, in the embodiment described above, the present invention is applied to recording on a magnetic tape. However, this invention is not so restricted and may be widely applied to other types of tape cassettes, for example, cassettes having a tape-shaped optical recording media accommodated in them.

Having described a preferred embodiment of the invention with reference to the accompanying drawings, it is to be understood that the invention is not limited to that precise embodiment and that various changes and modifications thereof may be effected by one skilled in the art without departing from the spirit or scope of the invention as defined in the appended claims.

What is claimed is:

1. A tape cassette comprising: a cassette housing accommodating tape reels and including upper and lower halves having front wall portions with forwardly projecting tape guides at opposite sides of said front wall portions defining a recess therebetween at the front of said housing; and a tape wound around the tape reels and having a run between said reels directed by said tape guides across said recess and spaced from said front wall portions; and a lid assembly including a front closure pivoted on said housing for movement between open and closed positions, said front closure having an asymmetrical inverted U-shaped cross-section to provide an outer portion, a shallow inner portion shorter than said outer portion and a top portion therebetween for respectively covering a front surface of said run of the tape extended across said recess at the front of said housing, an upper part of a rear surface of said run of the tape and an upper edge of said run of the tape when said front closure is in said closed position, a rear closure mounted for pivotal movement relative to said shallow inner portion and adapted to cover the remainder of said rear surface of said run of the tape extending across said recess when said front closure is in said closed position;

said upper half of the housing having an upper wall from which a co-planar fixed upper flange extends forwardly relative to said front wall portions up to said front closure in said closed position of the latter; and said tape guides and said front wall portions of the cassette housing having wall surfaces, at the sides and back of said recess and which, with said shallow inner portion of the front closure and said rear closure, define a mouse area closed at the top by said upper flange.

2. A tape cassette according to claim 1, wherein said rear closure is pivotally mounted on pins formed at opposite ends of said shallow inner portion of said front closure.

3. A tape cassette according to claim 2, wherein said cassette housing has guide grooves in said wall surfaces of the tape guides at the sides of said recess, and wherein said rear closure has means engaging said guide grooves for determining pivotal movements of said rear closure.

* * * * *